United States Patent
Guhl et al.

(10) Patent No.: US 6,187,281 B1
(45) Date of Patent: Feb. 13, 2001

(54) PROCESS FOR THE THERMAL PREPARATION OF TIN (IV) SULFIDES

(75) Inventors: Dieter Guhl, Speyer; Volker von Drach, Seeshaupt, both of (DE)

(73) Assignee: Th, Goldschmidt AG (DE)

( * ) Notice: Under 35 U.S.C. 154(b), the term of this patent shall be extended for 0 days.

(21) Appl. No.: 09/310,648

(22) Filed: May 12, 1999

(30) Foreign Application Priority Data

May 13, 1998 (DE) ............................................. 198 21 312

(51) Int. Cl.⁷ ................................................... C01B 17/20
(52) U.S. Cl. ......................................... 423/565; 423/561.1
(58) Field of Search .................................. 423/561.1, 565

(56) References Cited

U.S. PATENT DOCUMENTS

| | | | | |
|---|---|---|---|---|
| 2,585,161 | * | 2/1952 | Muskat et al. ...................... | 423/561.1 |
| 3,518,187 | * | 6/1970 | Groszek .............................. | 423/561.1 |
| 4,208,394 | * | 6/1980 | Chianelli et al. .................. | 423/561.1 |
| 4,681,777 | * | 7/1987 | Engelken et al. ................... | 423/565 |

FOREIGN PATENT DOCUMENTS

| | | |
|---|---|---|
| 0 654 616 A1 | 10/1994 | (EP) . |
| 0 806 396 A1 | 4/1997 | (EP) . |

OTHER PUBLICATIONS

Liu and Jiang, Huaxe Shije 1994, 35, 406 to 408 (CAS 123:115447).

Gmelin "Handbook der Anorganischen Chemie" (Handbook of Inorganic Chemistry), 8th Edition, Tin, Part C2, Springer Verlag, 1975, pp. 39 ff.).

* cited by examiner

*Primary Examiner*—Gary P. Straub
(74) *Attorney, Agent, or Firm*—Scully, Scott Murphy & Presser

(57) ABSTRACT

The invention relates to a process for the preparation of $SnS_2$ and comprises reacting $SnSO_4$, tin(II) formate or tin(II) oxalate with sulfur under a standard atmosphere or under protective gas without addition of halide-containing substances.

2 Claims, No Drawings

PROCESS FOR THE THERMAL PREPARATION OF TIN (IV) SULFIDES

The invention relates to a process for the preparation of tin(IV) sulfides by thermally reacting tin(II) compounds and sulfur under atmospheric pressure.

Tin(IV) sulfide is a compound which has long been known and occurs both naturally as a mineral and is also prepared synthetically. Under the name mosaic gold, it is used as pigment in tin bronzes.

In addition, tin sulfides have been gaining importance recently as lubricants. Thus, for example, EP-A-0 654 616 teaches that tin sulfides can be used advantageously in the production of brake linings. The nature of the tin sulfides, however, is not specified in more detail.

The purpose of the present invention is to develop an economic process for producing tin(IV) sulfide in high purity.

In principle, tin(IV) sulfide may be prepared by two methods: a) thermally from the elements and b) wet-chemically by precipitation of a tin salt using a sulfide source.

It is known that simply fusing tin and sulfur together does not lead to pure $SnS_2$. Even heating in evacuated pressure vessels at approximately 950° C. for a relatively long time does not lead to pure products.

It is further known (see Gmelin "Handbuch der Anorganischen Chemie" [Handbook of inorganic chemistry], 8th Edition, Tin, Part C2, Springer Verlag, 1975, pp. 39 ff.) that by reacting tin(II) chloride with elemental sulfur and ammonium chloride under a defined temperature regime and subsequent post-treatment of the reaction mass with elemental sulfur at 500° C. leads to tin(IV) sulfide. A similar process is described by Liu and Jiang, Huaxe Shije 1994, 35, 406 to 408 (CAS 123:115447).

EP-A-0 806 396 teaches that to prepare metal disulfides of the formula $(Sn_xMe_{1-x})S_2$, use is advantageously made of a mixture of metals, predominantly tin-based, having a superstoichiometric amount of sulfur in the presence of halide compounds, in particular in the presence of ammonium chloride or tin(II) chlorides.

It is characteristic of these processes that, although they start from cheap raw materials, they require high expenditure for the synthesis. Owing to the reaction temperatures necessary, technical problems result which are caused by the volatility of sulfur and—when chloride compounds are used—ammonium chloride and if appropriate tin(IV) chloride.

It is a disadvantage of these processes, in particular, that considerable amounts of exhaust gases are released during the reaction. Thus, to achieve sufficient purities, all of the ammonium chloride used must be expelled. In addition, there are losses of sulfur, which escapes in the form of sulfur dioxide. Furthermore, the chloride comes from the tin raw material, which is thought to escape in the form of hydrogen chloride or as tin(IV) chloride.

It is possible to absorb these residues from the exhaust gas stream, but this causes the production of waste substances which cannot generally be reutilized, since these are salt mixtures. Isolating the individual components from the exhaust gas streams has high equipment requirements and is thus very expensive.

In the case of the wet-chemical processes for preparing $SnS_2$, generally, a water-soluble tin salt is reacted with a sulfide source, the precipitated product is freed from the foreign salts and dried, e.g.

reaction of a solution of $SnCl_2$ in hydrochloric acid with sulfurous acid, SnS and elemental sulfur being produced as byproducts;

introduction of hydrogen sulfide into a weakly acidic tin(IV) chloride solution. Amorphous precipitates are produced as products.

For industrial implementation, the inadequate availability of $H_2S$ and its toxicity are great obstacles.

As described, the previously known methods for preparing $SnS_2$ are burdened with numerous disadvantages which appear to make industrial implementation difficult.

The object of the present invention is to find a process which makes it possible to obtain $SnS_2$ at high purity. At the same time, only small amounts of exhaust gas or exhaust gases, in a readily reutilizable form, are to be produced.

According to the prior art, it is known that only certain tin(II) compounds are suitable as a tin source for the reaction with sulfur to form $SnS_2$. These are, firstly, tin(II) chloride and, secondly, tin(II) sulfide. Tin(II) oxide, in contrast, only reacts with sulfur in traces to form tin(IV) sulfide. Nothing is known regarding other tin(II) compounds.

A further object of the present invention is therefore to provide other easily accessible tin(II) compounds as raw materials for a thermal reaction with sulfur to form $SnS_2$.

Surprisingly, it has been found that tin(II) compounds which are industrially available in large amounts represent useful starting substances for the synthesis.

Thus, it has been found, that, as starting compound, tin(II) sulfate is suitable. Crystalline tin(II) sulfate is mixed with sulfur powder, which is preferably used in an excess of from 5 to 20%, and is then calcined at atmospheric pressure in a crucible at temperatures from 350 to 650° C., preferably from 400 to 500° C. The resultant $SnS_2$ is a fine, homogeneous, yellowish-orange powder.

At reaction temperatures in the range from 350 to 450° C., a homogenous product is likewise obtained, but which can still comprise residues of unreacted sulfur.

Above 650° C., even at short reaction times, decomposition of the product occurs. A mixture of black, gray substances in addition to tin(IV) sulfide is obtained.

As gaseous byproduct, only sulfur dioxide is produced, which can be readily absorbed.

In addition, it has been found that tin(II) carboxylates are likewise suitable as raw materials. Preference is given in particular to tin(II) carboxylates which have the following properties:

solid state, residue-free decomposable mono-, di- or polycarboxylic acid.

Preference is given in this case to salts of carboxylic acids having up to 6 carbon atoms. If, for example, a mixture of tin(II) formate with sulfur is reacted in a crucible at from 450 to 750° C. in a standard atmosphere or under protective gas, a homogeneous, fine golden-yellow tin(IV) sulfide powder is obtained.

Constituents of the exhaust gas streams which were observed were carbon dioxide, sulfur dioxide and steam.

If a mixture of tin(II) oxalate with sulfur is calcined at from 450 to 750° C., preferably from 600 to 700° C., a homogenous golden-yellow $SnS_2$ powder is likewise produced. The reaction time is from 15 to 90 minutes, preferably from about 20 to 45 minutes. Constituents of the exhaust gas which were detected were carbon dioxide and sulfur dioxide.

The tin(IV) sulfides prepared in this manner are highly suitable for tribochemical purposes.

The results found are surprising to the extent that, according to the prior art, it could not be assumed that, without the presence of chloride-containing substances, whether ammonium chloride, or tin chloride, pure homogeneous tin(IV)

sulfides can be synthesized. It is advantageous, in particular, that exhaust gases are produced which are not contaminated with chloride-containing substances and to this extent open up the opportunity of further use. Absorbing the resulting sulfur dioxide is easily possible in a reaction under a standard atmosphere. Using alkali-metal-containing scrubbing solutions, alkali metal sulfites are formed, for which there are numerous applications.

The following examples describe the invention in more detail:

EXAMPLE 1

107 g of crystalline $SnSO_4$ are intimately mixed in a mortar with 35.2 g of sulfur and the mixture is charged into a crucible. The mixture is calcined at 450° C. in a furnace for 35 minutes.

The reaction product obtained is 110.2 g of a homogeneous golden-yellow mixture of $SnS_2$ and sulfur.

Analysis: Sn content: 63%.

EXAMPLE 2

104 g of tin(II) formate are intimately mixed in a mortar with 39 g of sulfur. In a crucible, the mixture is calcined at 600° C. for 32 minutes under a standard atmosphere.

91.1 g of a golden-yellow, homogeneous tin(IV) sulfide are obtained.

Analysis: Sn content: 66.4%.

EXAMPLE 3

206 g of tin(II) oxalate are intimately mixed in a mortar with 72 g of sulfur. The mixture is calcined in a crucible at 600° C. for 32 minutes under a standard atmosphere.

176.3 g of a loose golden-yellow, homogeneous $SnS_2$ powder are obtained.

Analysis: Sn content: 65.8%.

EXAMPLE 4

103 g of tin(II) oxalate are intimately mixed with 36 g of sulfur in a mortar and are calcined in a crucible at 700° C. for 37 minutes under a standard atmosphere.

84.5 g of a golden-yellow, homogeneous $SnS_2$ powder are isolated.

Analysis: Sn content: 65.4%.

EXAMPLE 5

103 g of $SnC_2O_4$ are mixed with 36 g of sulfur. The calcination temperature is 500° C., and the reaction period is 40 minutes.

86.8 g of $SnS_2$ of a golden-yellow color and homogeneous consistency are obtained.

Analysis: Sn content: 66.2%.

What is claimed is:

1. A process for the preparation of $SnS_2$, which comprises reacting $SnSO_4$ or tin(II) carboxylates with sulfur under a standard atmosphere or under protective gas without addition of halide-containing substances.

2. The process as claimed in claim 1, wherein, as tin(II) carboxylates, use is made of tin(II) formate or tin(II) oxalate.

* * * * *